United States Patent
Lee et al.

(10) Patent No.: US 12,462,864 B2
(45) Date of Patent: Nov. 4, 2025

(54) ELECTRONIC DEVICE AND OPERATING METHOD THEREOF

(71) Applicant: Samsung Electronics Co., Ltd., Suwon-si (KR)

(72) Inventors: Kyungsoo Lee, Yongin-si (KR); Yoonjick Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 204 days.

(21) Appl. No.: 17/881,208

(22) Filed: Aug. 4, 2022

(65) Prior Publication Data

US 2023/0162779 A1    May 25, 2023

(30) Foreign Application Priority Data

Nov. 19, 2021    (KR) .................. 10-2021-0160717

(51) Int. Cl.
| | |
|---|---|
| *G11C 11/4074* | (2006.01) |
| *G11C 7/24* | (2006.01) |
| *G11C 11/4093* | (2006.01) |
| *H03L 7/099* | (2006.01) |

(52) U.S. Cl.
CPC .......... *G11C 11/4074* (2013.01); *G11C 7/24* (2013.01); *G11C 11/4093* (2013.01); *H03L 7/0995* (2013.01)

(58) Field of Classification Search
CPC ............................ G11C 11/40; G11C 11/4074
USPC ....................................................... 365/226
See application file for complete search history.

(56) References Cited

U.S. PATENT DOCUMENTS

| | | | |
|---|---|---|---|
| 8,220,031 B2 | 7/2012 | Leterrier et al. | |
| 8,341,443 B2 | 12/2012 | Voorwinden et al. | |
| 10,908,843 B2 | 2/2021 | Byun | |
| 11,599,403 B2* | 3/2023 | Zapotylok | G06F 11/1048 |
| 2008/0304364 A1* | 12/2008 | Holtzman | G06F 21/725 368/10 |
| 2009/0150599 A1* | 6/2009 | Bennett | G06F 11/1471 711/E12.019 |
| 2011/0082963 A1* | 4/2011 | Jeddeloh | G06F 12/0246 365/226 |

(Continued)

FOREIGN PATENT DOCUMENTS

| | | |
|---|---|---|
| EP | 1460509 A1 | 9/2004 |
| EP | 2901362 B1 | 3/2017 |

OTHER PUBLICATIONS

European Search Report dated Apr. 18, 2023 for corresponding EP Patent Application No. 22199258.9.

*Primary Examiner* — Muna A Techane

(74) *Attorney, Agent, or Firm* — Harness, Dickey & Pierce, P.L.C.

(57) ABSTRACT

Provided are an electronic device and an operating method thereof. The electronic device includes a nonvolatile memory; a power management integrated circuit configured to generate operating power based on supply power received from a power source, and generate first time information independent of the supply power; and an application processor configured to receive the operating power, generate second time information, obtain, based on the generation of the operating power being interrupted, the first time information, and output, to the nonvolatile memory, time data including the first time information and the second time information, a write command, and an address.

7 Claims, 14 Drawing Sheets

(56) References Cited

U.S. PATENT DOCUMENTS

| | | | |
|---|---|---|---|
| 2012/0239865 A1* | 9/2012 | Matsumoto | G06F 11/1441 |
| | | | 711/E12.008 |
| 2012/0331290 A1 | 12/2012 | Margolis et al. | |
| 2015/0186676 A1 | 7/2015 | Arora et al. | |
| 2019/0012485 A1 | 1/2019 | Printemps et al. | |
| 2020/0110614 A1* | 4/2020 | Ma | G06F 11/3024 |
| 2020/0358618 A1* | 11/2020 | Lee | H04L 9/0819 |
| 2021/0208803 A1 | 7/2021 | Myers et al. | |
| 2021/0247800 A1 | 8/2021 | Ansari et al. | |

* cited by examiner

US 12,462,864 B2

ELECTRONIC DEVICE AND OPERATING METHOD THEREOF

CROSS-REFERENCE TO RELATED APPLICATION

This application is based on and claims priority under 35 U.S.C. § 119 to Korean Patent Application No. 10-2021-0160717, filed on Nov. 19, 2021, in the Korean Intellectual Property Office, the disclosure of which is incorporated by reference herein in its entirety.

BACKGROUND

The inventive concepts relate to electronic devices, and more particularly, to electronic devices and operating methods thereof.

Mobile devices perform various operations using time information. In general, time information of a mobile device is received from communication equipment capable of performing wireless communication, such as a base station, or is generated by a timer provided in the mobile device.

Time information for use in performing a security-based operation requires integrity, and such information in a mobile device may be altered due to an unexpected outage in power supply to the mobile device or may be tampered with by a malicious user attacking the mobile device. There is a demand for a scheme for preventing such time information from being altered or falsified.

SUMMARY

The inventive concepts provide electronic devices capable of ensuring the integrity of time information requiring security when a system-off state occurs, and operating methods thereof.

According to an aspect of the inventive concepts, there is provided an electronic device including a nonvolatile memory; a power management integrated circuit configured to generate operating power based on supply power received from a power source, and generate first time information independent of the supply power; and an application processor configured to receive the operating power, generate second time information, obtain, based on the generation of the operating power being interrupted, the first time information, and output, to the nonvolatile memory, time data including the first time information and the second time information, a write command, and an address.

According to another aspect of the inventive concepts, there is provided an electronic device including a nonvolatile memory to store time data including encrypted first and second time information; a power management integrated circuit configured to generate operating power based on supply power received from a power source, and generate first time information regardless of the supply power; and an application processor configured to output, based on the supply of the operating power being resumed, to the nonvolatile memory, an address and a read command for instructing to read the time data, obtain the first time information from the power management integrated circuit, and update the second time information generated before the supply of the operating power is interrupted, based on the obtained first time information and the read time data.

According to an aspect of the inventive concepts, there is provided an electronic device including a nonvolatile memory; a power management integrated circuit including a power capacitor configured to provide auxiliary power based on pre-charged electric charges in response to occurrence of a system-off state in which supply power received from a power source is interrupted, and a read-only timer configured to generate first time information based on the auxiliary power in the system-off state; and an application processor including a first system timer configured to generate second time information based on a clock source provided from an external source, a security processor configured to, based on the system-off state occurring, obtain the first time information and the second time information to generate time data, and a nonvolatile memory controller configured to provide the time data, a write command, and an address to the nonvolatile memory.

According to an aspect of the inventive concepts, there is provided an operating method of an electronic device including a power management integrated circuit, a nonvolatile memory, and an application processor, including generating first time information regardless of supply power received from a power source; receiving operating power generated based on the supply power and generating second time information; storing the first time information and the second time information in response to occurrence of a system-off state in which the generation of the operating power is interrupted; and updating the second time information based on the stored first and second time information in response to occurrence of a system-on state in which supply of the operating power is resumed.

BRIEF DESCRIPTION OF THE DRAWINGS

Example embodiments of the inventive concepts will be more clearly understood from the following detailed description taken in conjunction with the accompanying drawings in which.

DETAILED DESCRIPTION OF THE EMBODIMENTS

Hereinafter, example embodiments of the inventive concepts will be described in detail with reference to the accompanying drawings.

Figure 1:
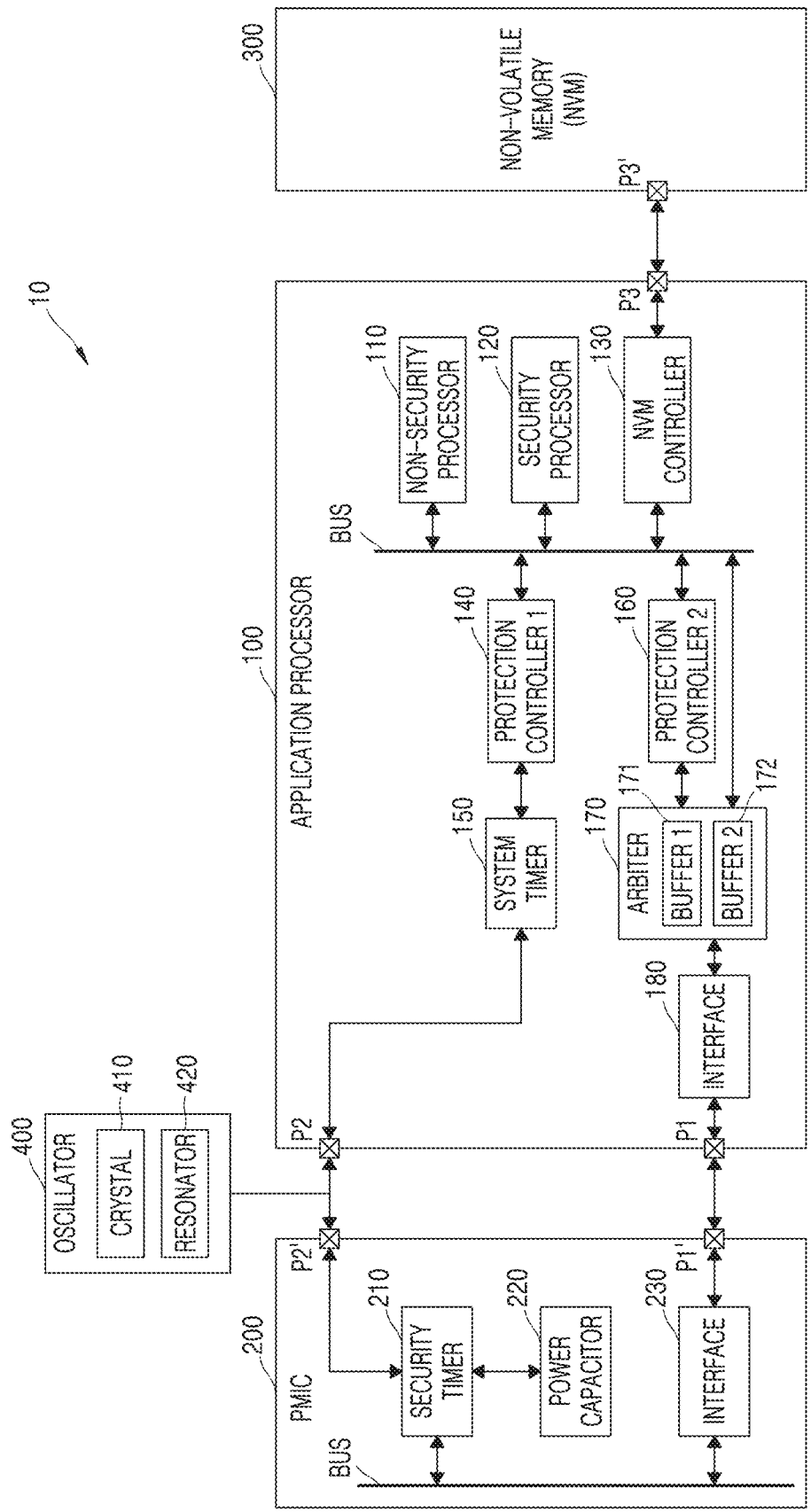
FIG. 1 is a diagram illustrating an electronic device according to some example embodiments of the inventive concepts.

FIG. 1 is a diagram illustrating an electronic device 10 according to some example embodiments of the inventive concepts.

Referring to FIG. 1, the electronic device 10 may be, for example, a stationary computing system such as a server, a desktop computer, a kiosk, or the like, or a subsystem thereof. As another example, the electronic device 10 may be a portable computing system such as a mobile phone, a wearable device, a laptop computer, or a subsystem thereof. As yet another example, the electronic device 10 may be a sub-system included in a system, such as a household appliance, an industrial apparatus, or a vehicle, which is different from a stand-alone computing system.

In some example embodiments, the electronic device 10 may include an application processor 100, a power management integrated circuit (PMIC) 200, a nonvolatile memory 300, and an oscillator 400.

The application processor 100 may receive operating power supplied from the PMIC 200 to process data. The application processor 100 may operate in a normal mode or a low-power mode. The normal mode may be a mode in which all components included in the application processor 100 are activated. The low-power mode may be a mode in which only some of the components included in the application processor 100 are activated. That is, the components activated in the low-power mode may be always-on components.

The application processor 100 may include a non-security processor 110, a security processor 120, a nonvolatile memory controller 130, a first protection controller 140, a system timer 150, a second protection controller 160, an arbiter 170, and an interface 180.

The non-security processor 110 may process overall tasks (or operations) of the electronic device 10. For example, the non-security processor 110 may perform booting in response to the electronic device 10 being powered on. The non-security processor 110 may process data stored in the nonvolatile memory 300 and may load, into the application processor 100, a program image stored in the nonvolatile memory 300. The non-security processor 110 may execute a program image stored in the nonvolatile memory 300. In the specification, executing, by the non-security processor 110, instructions included in a program image may be referred to as performing, by the non-security processor 110, overall operations of the electronic device 10. One or more non-security processors 110 may be provided, but the number of non-security processors 110 is not limited thereto, and the application processor 100 may include a single non-security processor 110. When a plurality of non-security processors 110 are provided, they may perform the same function or different functions. The non-security processor 110 may transmit, to the nonvolatile memory controller 130 through a bus BUS, a control command for instructing to store processed data. In the specification, the non-security processor 110 may be referred to as a main processor.

The security processor 120 may process data requiring security for various purposes. For example, the security processor 120 may safely process unique information related to a user of the electronic device 10, and may also safely process unique information related to the manufacturer or an authorized provider of the electronic device 10. However, the inventive concepts are not limited thereto. The number of security processors 120 may be one or more, but is not limited thereto. The security processor 120 may transmit, to the nonvolatile memory controller 130 through a bus BUS, a control command for instructing to store processed data. The security processor 120 may exclusively access the system timer 150 and a first buffer 171.

In some example embodiments, the security processor 120 may perform an operation requiring authentication by using time information requiring security. Examples of the operation requiring authentication may include an operation of executing content to which digital rights management (DRM) is applied, and an operation of blocking a user from inputting a password for a preset (or, alternatively, desired) time period in an unlocking situation in which the user is attempting to release a locked state. For example, the security processor 120 may execute DRM-applied content during an authentication period during which operations requiring authentication are executable. As another example, the security processor 120 may block the user from inputting a password during a locking period that is invoked when a screen unlock attempt fails in an unlocking situation. Throughout the specification, an operation requiring authentication may be referred to as an authentication operation. As described above, an authentication operation has a certain authentication period, which is set to allow or block execution of the authentication operation. To this end, it is necessary to determine whether a time point according to the time information requiring security is within the authentication period or the locking period described above. The security processor 120 may access the system timer 150, obtain time information from the system timer 150, and compare a time point according to the obtained time information with an authentication period or a locking period. In some example embodiments, in the case where the time point according to the obtained time information exceeds the expiration date of the authentication period, e.g., the authentication period has expired, execution of DRM-applied content may be blocked. That is, the security processor 120 does not execute the DRM-applied content. For example, in the case where data corresponding to DRM-applied content is stored in the nonvolatile memory 300; the authentication period of the DRM-applied content is one week; the operating mode of the electronic device 10 is an operating mode that blocks communication with a wireless communication device, e.g., a flight mode; and the electronic device 10 has been powered off for over one week and is then powered on, execution of the DRM-applied content is not allowed in the electronic device 10. In some example embodiments, when the locking period has expired, the security processor 120 may allow the user to input a password. For example, in the case where the user has continuously (or repeatedly, such as in discrete attempts) failed to unlock the screen of the electronic device 10; the locking period of the electronic device 10 is one hour; the operating mode of the electronic device 10 is an operation mode that blocks communication with a wireless communication device, e.g., a flight mode; and the electronic device 10 has been powered off after the locking period is initiated and then is powered on after one hour, the user is immediately allowed to attempt to unlock the screen of the electronic device 10. Consequently, convenience may be provided to the user.

In some example embodiments, the security processor 120 may update time information generated by the system timer 150 while operating power is supplied to the application processor 100.

The nonvolatile memory controller 130 may communicate with the nonvolatile memory 300. The nonvolatile memory controller 130 may control the nonvolatile memory 300 to store data processed by the non-security processor 110 or the security processor 120. Alternatively, the nonvolatile memory controller 130 may read data stored in the nonvolatile memory 300 and transmit the read data to the non-security processor 110 or the security processor 120.

The first protection controller 140 may allow access by the security processor 120 and block access by the non-security processor 110. For example, the first protection controller 140 may transmit the time information generated by the system timer 150 to the security processor 120 in response to access by the security processor 120. As another example, the first protection controller 140 may block access by the non-security processor 110 to the system timer 150. The first protection controller 140 may be implemented as a TrustZone Protection Controller (TZPC).

The system timer 150 may generate time information based on a clock source. The clock source may be, for example, a frequency generated by the oscillator 400, and the value of the clock source may be, for example, 32.768 kHz. However, the inventive concepts are not limited thereto. The time information may be, for example, information indicating "year", "month", "day", "hour", "minute", and "second". The system timer 150 may be implemented as a counter configured to count from an initial value set by the security processor 120. Throughout the specification, the system timer 150 may be referred to as a real time clock.

The second protection controller 160 may allow access by the security processor 120 and block access by the non-security processor 110. For example, the second protection controller 160 may allow the security processor 120 to access the first buffer 171 and block the non-security processor 110 from accessing the first buffer 171. The second protection controller 160 may allow the non-security processor 110 to access a second buffer 172. Like the first protection controller 140, the second protection controller 160 may be implemented as a TZPC.

The arbiter 170 may allow the security processor 120 to access tamper-proof time information. To this end, the arbiter 170 may include the first buffer 171 and the second buffer 172.

The first buffer 171 may temporarily store data accessible only by the security processor 120. For example, the first buffer 171 may store data including time information generated by a security timer 210.

The second buffer 172 may temporarily store data accessible by the non-security processor 110. For example, the second buffer 172 may temporarily store data including information generated by the non-security processor 110.

In the application processor 100, the arbiter 170 may be arranged in the interface 180, and thus a separate dedicated interface for preventing information from being tampered with may be omitted. Accordingly, the chip size and overhead may be reduced, compared to the case where an interface specifically for tamper prevention is provided.

The interface 180 may communicate with the PMIC 200. In detail, the interface 180 may receive time information from the PMIC 200 through a first pin P1 provided in the application processor 100. To this end, the interface 180 may be implemented as an inter-integrated circuit (PC), a serial peripheral interface (SPI), or the like, but is not limited thereto.

The security processor 120, the first protection controller 140, the system timer 150, the second protection controller 160, the arbiter 170, and the interface 180 may be configured to be always on. However, when a system-off state occurs, e.g., when the electronic device 10 is abnormally powered off, the security processor 120, the first protection controller 140, the system timer 150, the second protection controller 160, the arbiter 170, and the interface 180 may also be powered off.

The PMIC 200 may generate operating power based on power supplied from a power source. Here, the power source may be, for example, a battery provided in the electronic device 10, but is not limited thereto. The operating power may be supplied to the application processor 100 and the nonvolatile memory 300.

The PMIC 200 may include the security timer 210, a power capacitor 220, and an interface 230.

When the electronic device 10 is in a system-on state, the security timer 210 may receive supply power to generate time information based on a clock source. Alternatively, when the electronic device 10 is in a system-off state, the security timer 210 may receive auxiliary power supplied from the power capacitor 220 to generate the time information based on the clock source. That is, the security timer 210 may generate the time information regardless (or independent) of the supply power.

The time information generated by the security timer 210 may be, for example, information indicating "year", "month", "day", "hour", "minute", and "second". The security timer 210 may be implemented as a counter configured to count from a preset (or, alternatively, desired) initial value. In some example embodiments, the security timer 210 may be a read-only timer. In this case, because it is impossible to perform a write operation on the security timer 210, the integrity of the time information generated by the security timer 210 is ensured, the time information generated by the security timer 210 is prevented from being altered by the non-security processor 110, a separate security design is not required to be implemented in the PMIC 200, and accordingly, the manufacturing costs and chip size may be reduced. The time information may be transmitted to the interface 230 through a bus BUS.

The power capacitor 220 may receive the supply power to charge electric charges. When the generation of the operating power is interrupted, e.g., when a system-off state occurs, the power capacitor 220 may generate auxiliary power based on the charged electric charges. The generated auxiliary power may be supplied to the security timer 210. Throughout the specification, the power capacitor 220 may be referred to as a super capacitor or a coin battery domain.

The interface 230 may communicate with the application processor 100. In detail, the interface 230 may transmit time information through a first pin P1' provided in the PMIC 200. To this end, the interface 230 may be implemented as an I²C, or the like, but is not limited thereto.

The nonvolatile memory 300 may receive a command and an address from the nonvolatile memory controller 130, and access a memory cell selected by the address among a plurality of memory cells included in the nonvolatile memory 300. The nonvolatile memory 300 may perform an operation indicated by the command with respect to the memory cell selected by the address. Here, the command may be, for example, a program command, a read command, or an erase command, and the operation indicated by the command may be, for example, a program operation, a read operation, or an erase operation. The nonvolatile memory 300 may be, for example, flash memory. Examples of flash memory may include NAND flash memory, vertical NAND flash memory, NOR flash memory, resistive random-access memory, phase-change memory, magnetoresistive random-access memory, etc. The nonvolatile memory 300 may be implemented in the form of a universal flash storage (UFS) card.

In some example embodiments, the nonvolatile memory 300 may store time data or output the stored time data. The time data may be data including time information generated by the security timer 210 and the system timer 150 when a system-off state occurs.

The oscillator 400 may provide a clock source for generating time information. In detail, the oscillator 400 may provide the clock source to the system timer 150 and the security timer 210 through second pins P2 and P2' provided in the application processor 100 and the PMIC 200, respectively. The oscillator 400 may include a crystal 410 and a resonator 420. In some example embodiments, the resonator 420 may be included in the PMIC 200.

Although not illustrated, according to some example embodiments of the inventive concepts, the electronic device 10 may further include a network device that performs communication with a communication device such as a base station capable of wireless communication. In this case, the network device may receive global time information indicating a global time from the base station, and transmit the received time information to the application processor 100. The global time information may be used as an initial value to be set in the system timer 150 or may be used to correct an error of the time information generated by the system timer 150.

Throughout the specification, time information generated by the security timer 210 is referred to as security time information or first time information, and time information generated by the system timer 150 is referred to as system time information or second time information.

Figure 2:
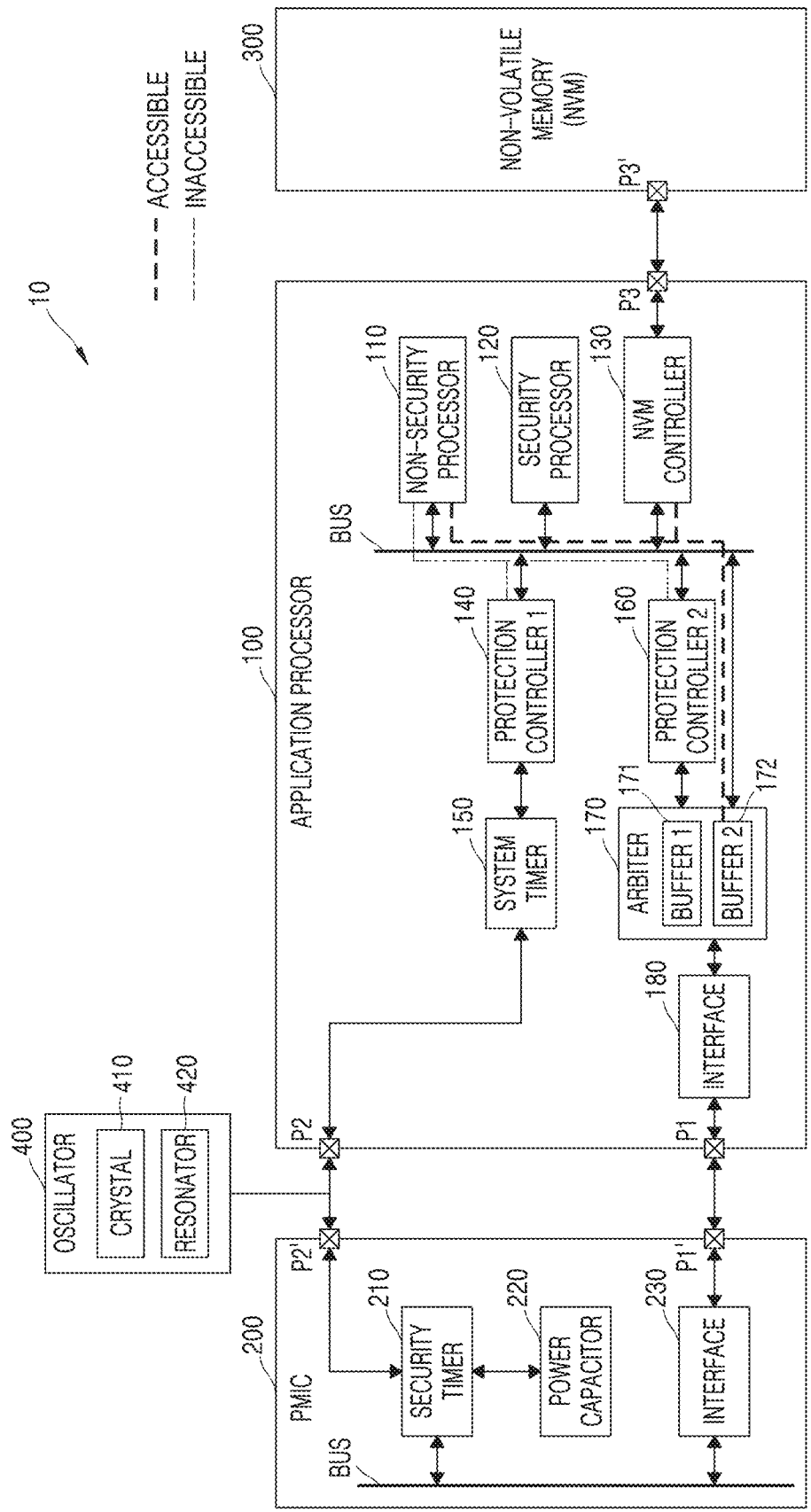
FIG. 2 is a diagram illustrating an example of components that are accessible or inaccessible by a non-security processor, according to some example embodiments of the inventive concepts.

FIG. 2 is a diagram illustrating an example of components that are accessible or inaccessible by the non-security processor 110, according to some example embodiments of the inventive concepts.

Referring to FIG. 2, the non-security processor 110 is accessible to the nonvolatile memory controller 130. For example, the non-security processor 110 may output processed data and a control signal to store the processed data in the nonvolatile memory 300. The data and the control signal may be transmitted to the nonvolatile memory controller 130 through the bus BUS.

The non-security processor 110 is accessible to the second buffer 172. For example, the non-security processor 110 may transmit processed data to the second buffer 172 to provide the processed data to the PMIC 200. In this case, the data output by the non-security processor 110 may be transmitted to the second buffer 172 through a channel between the arbiter 170 and the bus BUS.

The non-security processor 110 is inaccessible to the system timer 150 and the first buffer 171. This is for preventing the non-security processor 110, in the case where it is malfunctioning or under control by a malicious user, from tampering with the first time information stored in the first buffer 171 or the second time information generated by the system timer 150. For example, the first protection controller 140 may block the non-security processor 110 from accessing the system timer 150. The second protection controller 160 may block the non-security processor 110 from accessing the first buffer 171.

Figure 3:
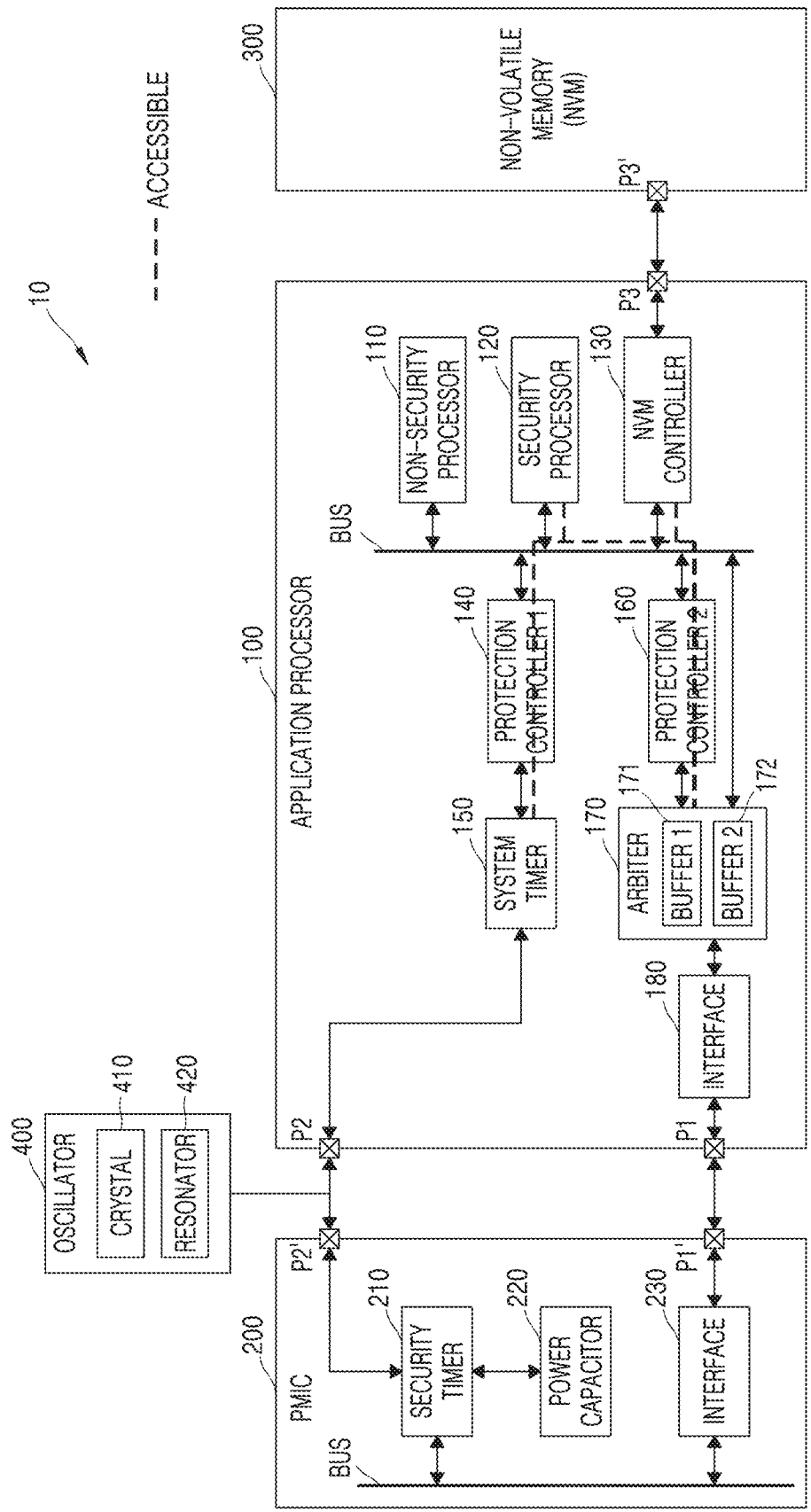
FIG. 3 is a diagram illustrating an example of components that are accessible by a security processor, according to some example embodiments of the inventive concepts.

FIG. 3 is a diagram illustrating an example of components that are accessible by the security processor 120, according to some example embodiments of the inventive concepts.

Referring to FIG. 3, the security processor 120 is accessible to the system timer 150. For example, the first protection controller 140 may allow the security processor 120 to access the system timer 150, and the security processor 120 may obtain the second time information generated by the system timer 150 or may set updated time information (or corrected time information) as the second time information in the system timer 150. The second time information or the updated time information may be transmitted through the bus BUS.

The security processor 120 is accessible to the first buffer 171. For example, the second protection controller 160 may allow the security processor 120 to access the first buffer 171, and the security processor 120 may obtain data stored in the first buffer 171. In this case, the data stored in the first buffer 171 may be transmitted to the security processor 120 through a channel between the second protection controller 160, the arbiter 170, and the bus BUS.

Figure 4:
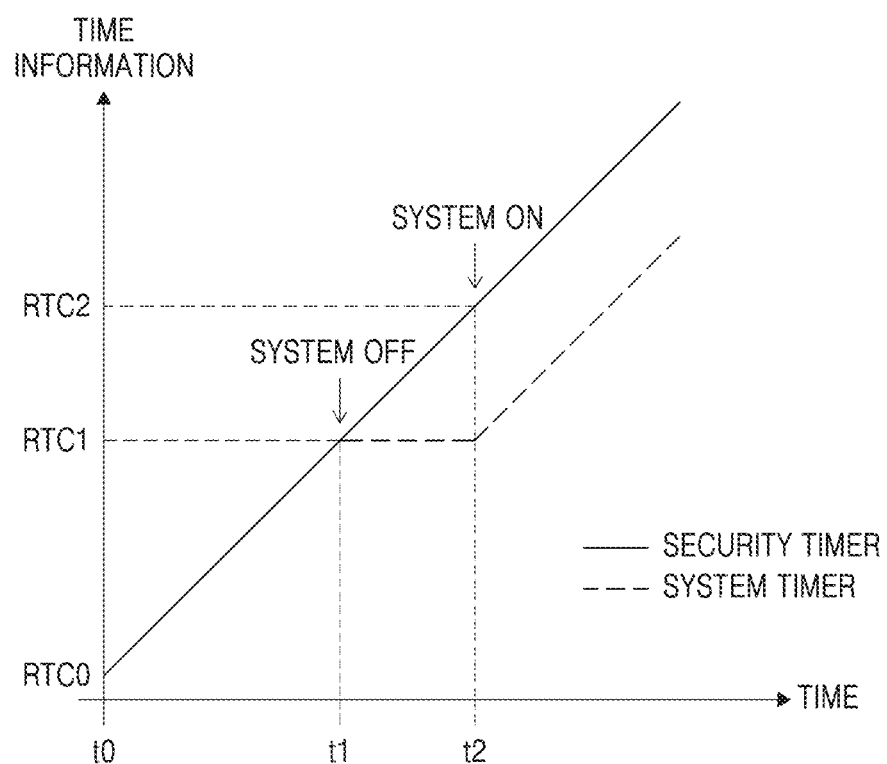
FIG. 4 is a graph showing an example of time information generated by each of a security timer and a system timer, according to some example embodiments of the inventive concepts.

FIG. 4 is a graph showing an example of time information generated by each of a security timer and a system timer, according to some example embodiments of the inventive concepts.

Referring to FIG. 4, at t0, the electronic device 10 is initially booted. In this case, the security processor 120 may set, on the system timer 150, an initial value RTC0 according to initial time information. Meanwhile, the security timer 210 has been storing data including the initial value RTC0 since before the shipment of the electronic device 10. The application processor 100 may be in a sleep state.

After t0, the PMIC 200 may generate operating power, and the application processor 100 in the sleep state may wake up. The security timer 210 may perform an operation of counting from the initial value RTC0, in response to a clock source. The system timer 150 may also perform an operation of counting from the initial value RTC0, in response to the clock source. The value according to the time information may gradually increase as the time passes.

At t1, a system-off state may occur. The system-off state may be a state in which power supplied from a power source is interrupted, or a state in which the generation of the operating power is interrupted. In this case, the power capacitor 220 may generate auxiliary power, and the security timer 210 may receive the auxiliary power to perform the counting operation. The value according to first time information generated by the security timer 210 increases as the time passes. At t1, the value according to the first time information may be a first value RTC1. When the system-off state occurs, the supply of operating power to the application processor 100 is interrupted, and thus the system timer 150 stops the counting operation. At t1, the value according to second time information generated by the system timer 150 is the first value RTC1 and is constant. At t1, the security processor 120 may transmit, to the nonvolatile memory controller 130, data including the second time information and a control signal to store, in the nonvolatile memory 300, the second time information generated by the system timer 150.

At t2, a system-on state may occur. The system-on state may be a state in which the supply of operating power is resumed. At t2, the value according to the first time information generated by the security timer 210 may be a second value RTC2. Meanwhile, when the system-on state occurs, the operating power is supplied to the application processor 100, and thus, the security processor 120 may transmit a control signal to the nonvolatile memory controller 130 to obtain the second time information stored in the nonvolatile memory 300. When the security processor 120 obtains the second time information stored in the nonvolatile memory 300, the security processor 120 sets the obtained second time information on the system timer 150. In this case, because the value according to the first time information generated by the security timer 210 after t2 increases from the first value RTC1, the first time information and the second time information may be inconsistent with each other.

Figure 5:
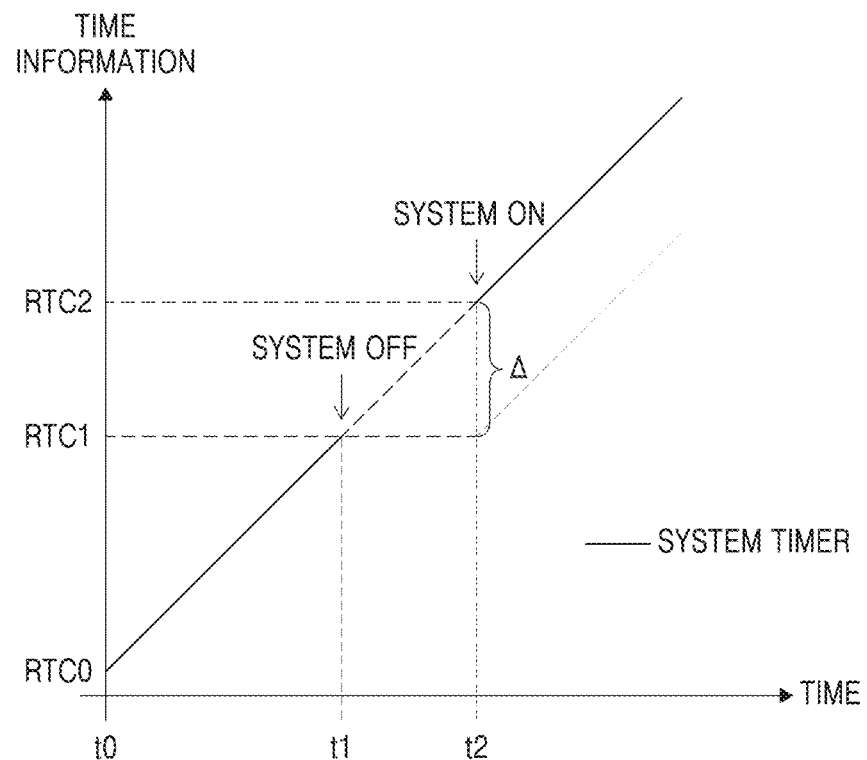
FIG. 5 is a graph for describing an example of updating time information generated by a system timer, according to some example embodiments of the inventive concepts.

FIG. 5 is a graph for describing an example of updating time information generated by a system timer, according to some example embodiments of the inventive concepts.

Referring to FIG. 5, at t0, the electronic device 10 may be initially booted, and the security processor 120 may set the initial value RTC0 on the system timer 150. After t0, the security timer 210 and the system timer 150 may perform an operation of counting from the initial value RTC0, in response to a clock source.

At t1, a system-off state may occur. In this case, the system timer 150 stops the counting operation. The security processor 120 may transmit data including first time information and second time information, and a control signal to the nonvolatile memory controller 130 to store the first time information and the second time information at t1 in the nonvolatile memory 300. The nonvolatile memory controller 130 may transmit the data, a write command, and a first address to the nonvolatile memory 300. The values according to the first time information and the second time information stored in the nonvolatile memory 300 may be the first value RTC1.

At t2, a system-on state may occur. The security processor 120 may transmit a control signal to the nonvolatile memory controller 130 to obtain the first time information and the second time information stored in the nonvolatile memory 300. The nonvolatile memory controller 130 may transmit a read command and the second address to the nonvolatile memory 300. The first address and the second address are equal to each other. Meanwhile, the security processor 120 additionally obtains first time information generated at t2. The value according to the first time information generated at t2 may be the second value RTC2. The security processor 120 may update the second time information obtained from the nonvolatile memory 300, based on the first time information generated at t2 and the first time information stored in the nonvolatile memory 300. For example, the value according to the first time information stored in the nonvolatile memory 300 is the first value RTC1, and the value according to the first time information generated at t2 is the second value RTC2. The security processor 120 calculates a time difference Δ between the first value RTC1 and the second value RTC2. In addition, the security processor 120 may update the second time information obtained from the nonvolatile memory 300 by adding the time difference Δ to the value (e.g., the first value RTC1) according to the second time information stored in the nonvolatile memory 300. The value according to the second time information updated at t2 is the second value RTC2.

After t2, the value according to the first time information and the value according to the second time information may be equal to each other, and may increase from the second value RTC2.

Figure 6:
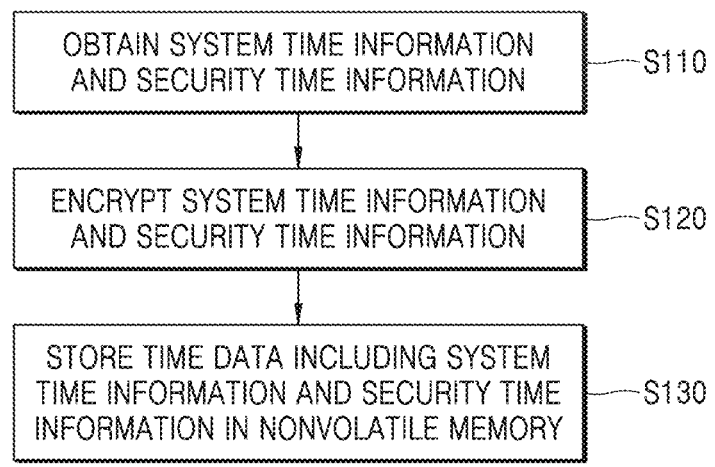
FIG. 6 is a flowchart of an operating method of an application processor when a system-off state occurs, according to some example embodiments of the inventive concepts.

FIG. 6 is a flowchart of an operating method of an application processor when a system-off state occurs, according to some example embodiments of the inventive concepts.

Referring to FIGS. 1, 5, and 6, in operation S110, the application processor 100 obtains system time information and security time information. The system time information is second time information generated by the system timer 150, and the security time information is first time information generated by the security timer 210. In detail, for example, at t1, the security processor 120 obtains the first time information through the interface 180 and the second time information through the bus BUS and the first protection controller 140.

In operation S120, the application processor 100 encrypts the obtained system time information and security time information. In detail, for example, at t1, the security processor 120 encrypts the first and second time information by using an encryption algorithm. This is to ensure the reliability of the first and second time information at t1.

In operation S130, the application processor 100 stores time data including the system time information and the security time information in the nonvolatile memory 300. In some example embodiments, the time data may include the encrypted system time information and security time information. In detail, for example, at t1, the security processor 120 may transmit the time data and a control signal to the nonvolatile memory controller 130, and the nonvolatile memory controller 130 may transmit the time data, a write command, and an address to the nonvolatile memory controller 130.

Figure 7:
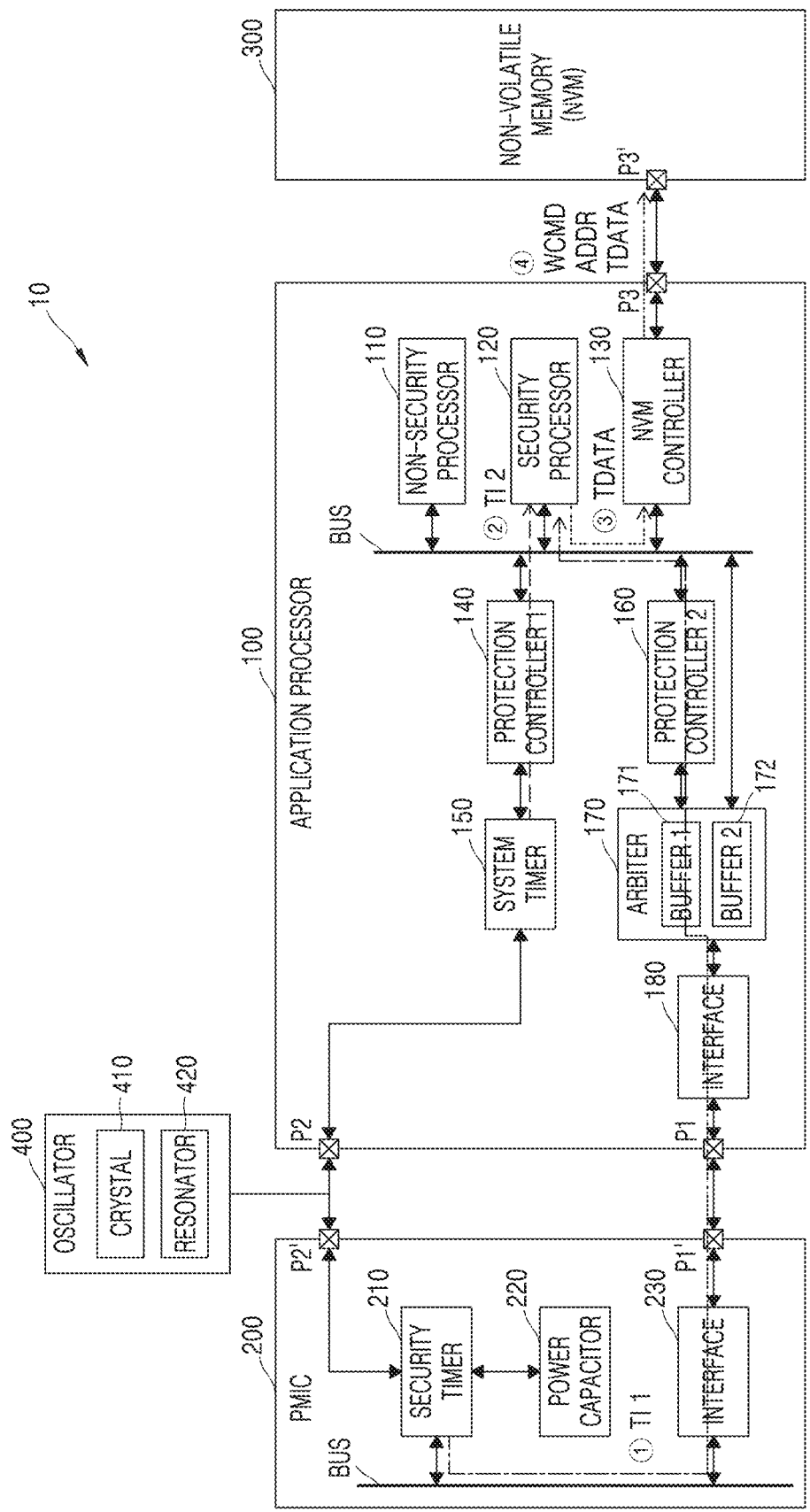
FIG. 7 is a diagram for describing the flowchart illustrated in FIG. 6 in detail.

FIG. 7 is a diagram for describing the flowchart illustrated in FIG. 6 in detail.

Referring to FIGS. 5, 6, and 7, when the generation of operating power is interrupted, the application processor 100 obtains first time information TI 1 from the PMIC 200 and outputs, to the nonvolatile memory 300, time data TDATA including the first time information TI 1 and second time information TI 2, a write command WCMD, and an address ADDR.

In operation S110, the security timer 210 outputs (①), to the interface 230 through the bus BUS, the first time information TI 1, which is generated when the generation of the operating power is interrupted (e.g., at t1). The first time information TI 1 is transmitted to the application processor 100 through the first pin P1' of the PMIC 200. The first time information TI 1 transmitted through the first pin P1 of the application processor 100 is temporarily stored in the first buffer 171 through the interface 180. The security processor 120 accesses the first buffer 171 through the second protection controller 160 to obtain the first time information TI 1. The system timer 150 outputs (②), to the security processor 120 through the first protection controller 140 and the bus BUS, the second time information TI 2, which is generated when the generation of the operating power is interrupted (e.g., at t1).

In operation S120, the security processor 120 encrypts the first time information TI 1 and the second time information TI 2, which are generated at t1, and outputs (③), as the time data TDATA, data including the encrypted first and second time information. The time data TDATA is transmitted to the nonvolatile memory controller 130 through the bus BUS.

In operation S130, the nonvolatile memory controller 130 may output (④) the write command WCMD, the address ADDR, and the time data TDATA. The write command WCMD, the address ADDR, and the time data TDATA are transmitted to the nonvolatile memory 300 through a third pin P3 of the application processor 100. The nonvolatile memory 300 receives the write command WCMD, the address ADDR, and the time data TDATA through a third pin P3' of the nonvolatile memory 300, and stores the time data TDATA in memory cells pointed to by the address ADDR.

Figure 8:
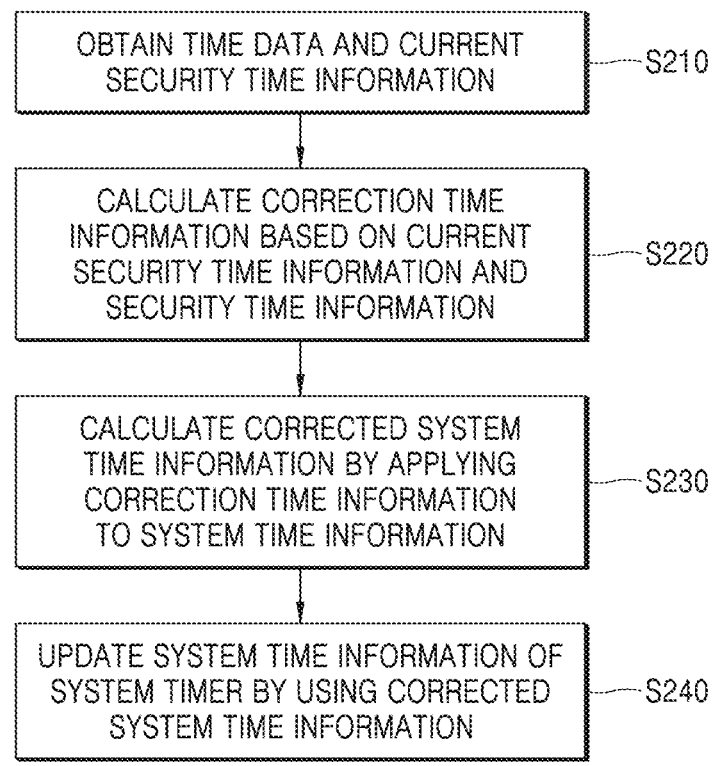
FIG. 8 is a flowchart of an operating method of an application processor when a system-on state occurs after occurrence of a system-off state, according to some example embodiments of the inventive concepts.

FIG. 8 is a flowchart of an operating method of an application processor when a system-on state occurs after the occurrence of a system-off state, according to some example embodiments of the inventive concepts.

Referring to FIG. 8, in operation S210, the application processor 100 obtains time data and current security time information. The time data includes encrypted first and second time information and is stored in the nonvolatile memory 300. The encrypted first and second time information is generated when the system-off state occurs. The current security time information is first time information generated by the security timer 210 when the system-on state occurs after the occurrence of the system-off state. In detail, for example, at t2, the security processor 120 obtains the first time information through the interface 180 and obtains the time data through the bus BUS and the nonvolatile memory controller 130.

In operation S220, the application processor 100 calculates correction time information based on the current security time information and the security time information. The security time information is the first time information included in the time data, and the correction time information is information indicating the difference between the current security time information and the security time information, e.g., the time difference Δ described with reference to FIG. 5. In detail, for example, the security processor 120 may decrypt the encrypted first and second time information, and calculate the time difference Δ between time points according to the decrypted first and second time information.

In operation S230, the application processor 100 calculates corrected system time information by applying the correction time information to the system time information. The corrected system time information may be updated second time information, and may indicate the second value RCT2 at t2 as described above with reference to FIG. 5. In detail, for example, the security processor 120 may calculate the second value RTC2 by adding the first value RTC1 to the time difference Δ.

In operation S240, the application processor 100 updates the system time information of the system timer 150 by using the corrected system time information. In detail, for example, the security processor 120 may update the system time information of the system timer 150 by setting the second value RTC2 on the system timer 150.

Figure 9:
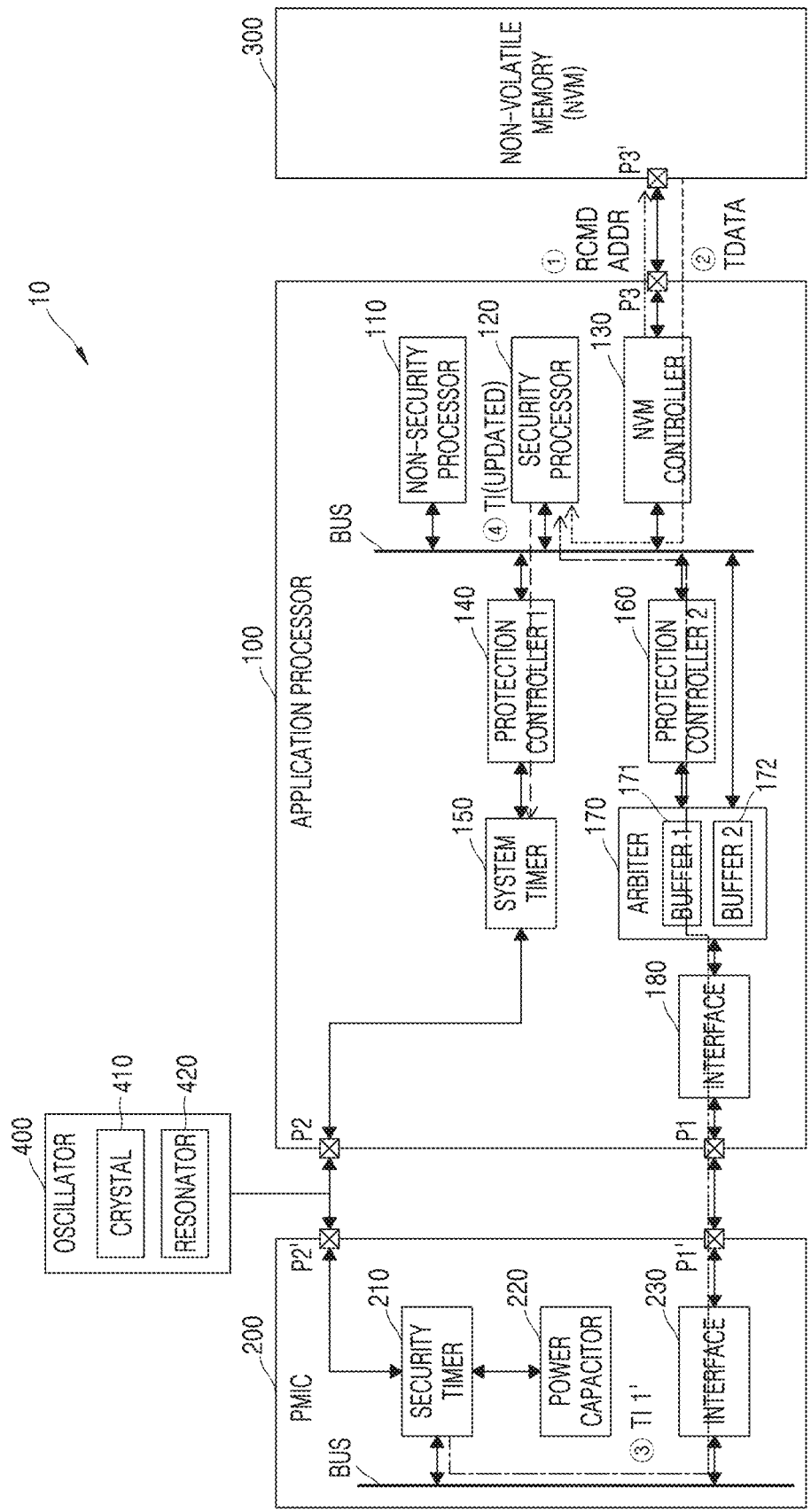
FIG. 9 is a diagram for describing the flowchart illustrated in FIG. 8 in detail.

FIG. 9 is a diagram for describing the flowchart illustrated in FIG. 8 in detail.

Referring to FIGS. 5, 7, 8, and 9, when the supply of the operating power is resumed, the application processor 100 may output, to the nonvolatile memory 300, a read command RCMD and the address ADDR, for instructing to read the time data TDATA, may obtain first time information TI 1' from the PMIC 200, and may update the second time information generated before the supply of the operating power is interrupted (e.g., at t1), based on the obtained first time information TI 1' and the read time data TDATA.

In operation S210, the nonvolatile memory controller 130 outputs the read command RCMD and the address ADDR when the supply of the operating power is resumed (①). The read command RCMD and the address ADDR are transmitted to the nonvolatile memory 300 through the third pin P3 of the application processor 100. The nonvolatile memory 300 receives the read command RCMD and the address ADDR through the third pin P3' of the nonvolatile memory 300 and outputs the stored time data TDATA. The time data TDATA is transmitted to the application processor 100 through the third pin P3' of the nonvolatile memory 300. The time data TDATA received through the third pin P3 of the application processor 100 is then transmitted to the security processor 120 (②). The time data TDATA includes the encrypted first time information TI 1 and second time information TI 2 described above with reference to FIG. 7. The security timer 210 outputs, to the interface 230 through the bus BUS, the first time information TI 1', which is generated when the supply of the operating power is resumed (e.g., at t2) (③). The first time information TI 1' is temporarily stored in the first buffer 171 through the interface 180. The security processor 120 accesses the first buffer 171 through the second protection controller 160 to obtain the first time information TI 1'.

In operation S220, the security processor 120 may decrypt the encrypted first time information TI 1 and second time information TI 2 from the time data TDATA, and calculate difference time information (e.g., the time difference Δ illustrated in FIG. 5) between the decrypted first time information TI 1 and the obtained first time information TI 1'. In operation S230, the security processor 120 generates updated second time information TI (UPDATED) by applying the difference time information to the decrypted second time information TI 2. In operation S240, the security processor 120 may set the updated second time information TI (UPDATED) on the system timer 150 (④).

Figure 10:
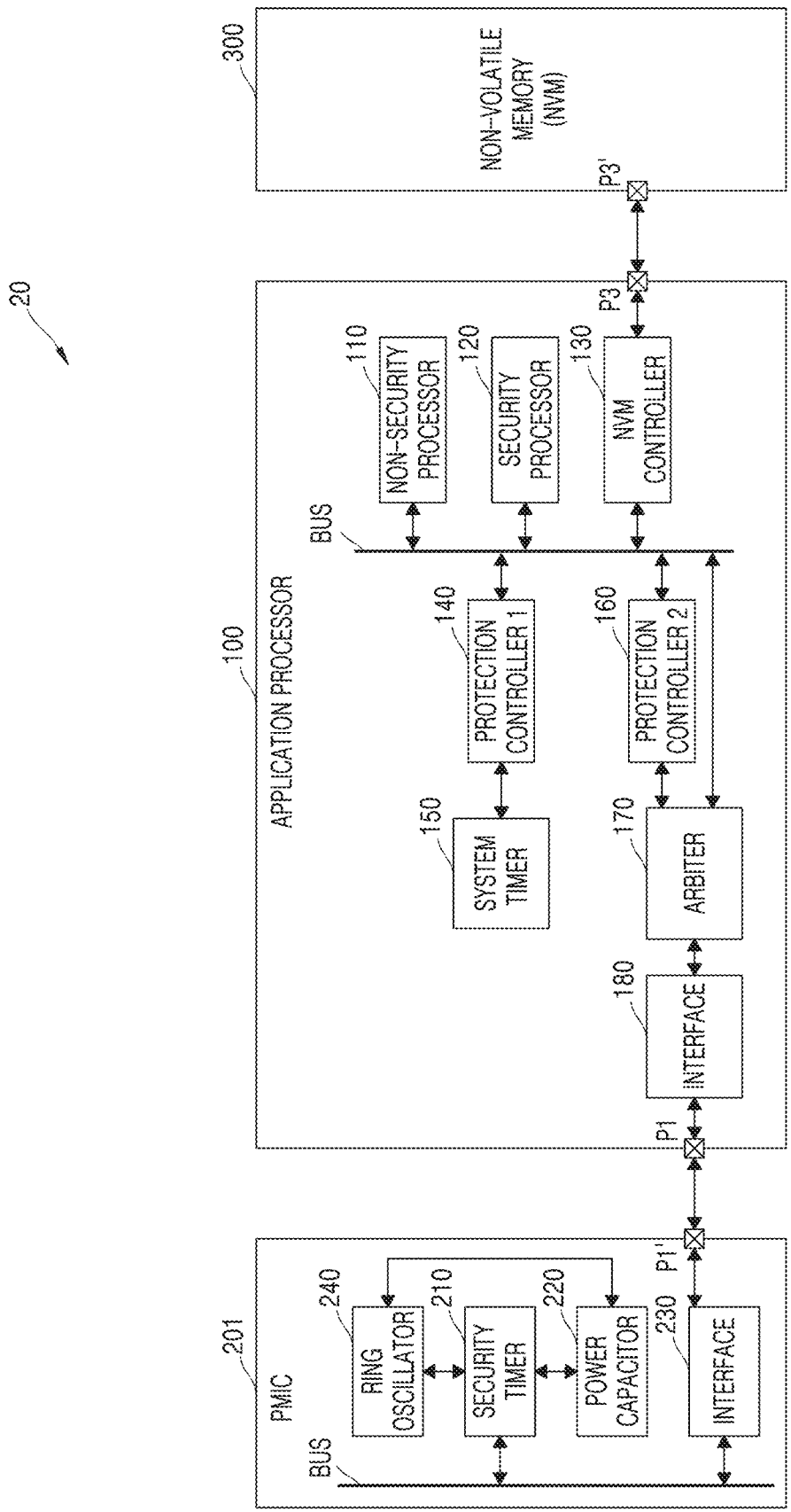
FIG. 10 is a diagram illustrating an electronic device according to some example embodiments of the inventive concepts.

FIG. 10 is a diagram illustrating an electronic device 20 according to some example embodiments of the inventive concepts.

Referring to FIG. 10, the electronic device 20 according to some example embodiments of the inventive concepts may include the application processor 100, a PMIC 201, and the nonvolatile memory 300. The application processor 100 and the nonvolatile memory 300 are the same as described above with reference to FIG. 1.

The PMIC 201 may include the security timer 210, the power capacitor 220, the interface 230, and a ring oscillator 240. The security timer 210, the power capacitor 220, and the interface 230 are the same as described above with reference to FIG. 1.

The ring oscillator 240 may generate a clock source based on supply power. When a system-off state occurs, the ring oscillator 240 may receive auxiliary power from the power capacitor 220 and provide the clock source to the security timer 210.

Although not illustrated, the application processor 100 and the PMIC 201 may include the second pins P2 and P2', respectively. The electronic device 20 according to some example embodiments of the inventive concepts may further include the oscillator 400 illustrated in FIG. 1.

Figure 11:
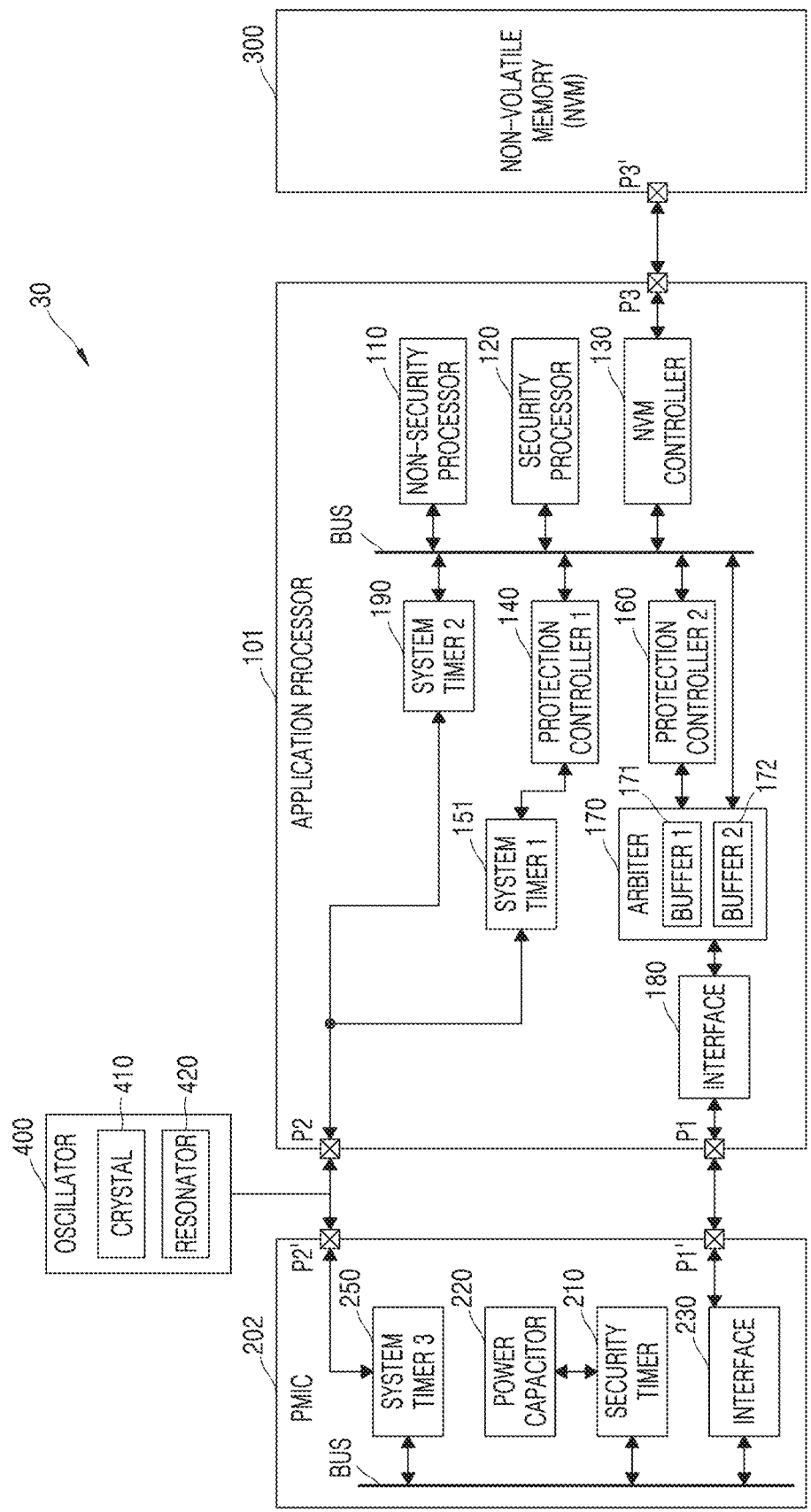
FIG. 11 is a diagram illustrating an electronic device according to some example embodiments of the inventive concepts.

FIG. 11 is a diagram illustrating an electronic device 30 according to some example embodiments of the inventive concepts.

Referring to FIG. 11, the electronic device 30 according to some example embodiments of the inventive concepts may include an application processor 101, a PMIC 202, the nonvolatile memory device 300, and the oscillator 400. The nonvolatile memory device 300 and the oscillator 400 are the same as described above with reference to FIG. 1.

The application processor 101 may include the non-security processor 110, the security processor 120, the nonvolatile memory controller 130, the first protection controller 140, a first system timer 151, the second protection controller 160, the arbiter 170, the interface 180, and a second system timer 190. The non-security processor 110, the security processor 120, the nonvolatile memory controller 130, the first protection controller 140, the second protection controller 160, the arbiter 170, and the interface 180 are the same as described above with reference to FIG. 1.

The first system timer 151 may correspond to the system timer 150 illustrated in FIG. 1. The first system timer 151 may generate second time information based on a clock source provided from outside of the application processor 101 (e.g., from the oscillator 400).

The second system timer 190 may generate third time information based on a clock source provided from outside of the application processor 101 (e.g., from the oscillator 400). The third time information may be information about time used in the electronic device 30. The non-security processor 110 may perform overall operations of the electronic device 30 based on the third time information. For example, the non-security processor 110 may process a time image for notifying a user of time according to the third time information. When the electronic device 30 is booted, the non-security processor 110 may set an initial value on the second system timer 190.

The PMIC 202 may include the security timer 210, the power capacitor 220, the interface 230, and a third system timer 250. The security timer 210, the power capacitor 220, and the interface 230 are the same as described above with reference to FIG. 1. The security timer 210 may be a read-only timer.

The third system timer 250 may generate third time information based on a clock source provided from the outside (e.g., the oscillator 400).

In some example embodiments, the non-security processor 110 may obtain the third time information generated by the third system timer 250 and copy the obtained time information to the second system timer 190. The third time information may be stored in the second buffer 172 by the interface 180.

Although not illustrated, the electronic device 30 according to some example embodiments of the inventive concepts may further include a ring oscillator configured to receive auxiliary power and provide a clock source to the security timer 210 in response to the occurrence of a system-off state.

Figure 12:
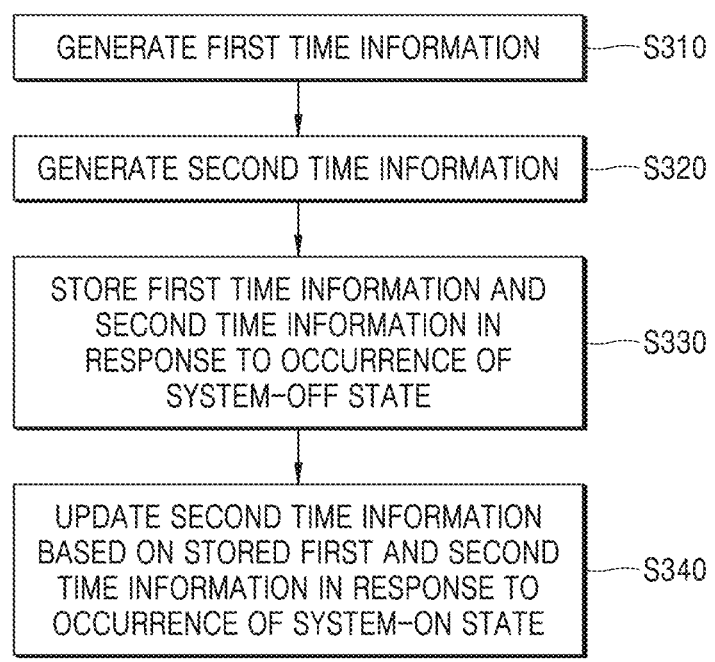
FIG. 12 is a flowchart of an operating method of an electronic device according to some example embodiments of the inventive concepts.

FIG. 12 is a flowchart of an operating method of an electronic device according to some example embodiments of the inventive concepts.

Referring to FIGS. 1 and 12, the operating method of the electronic device 10 includes generating first time information regardless of supply power received from a power source (S310), receiving operating power generated based on the supply power and generating second time information (S320), storing the first time information and the second time information in response to the occurrence of a system-off state corresponding to a state in which the generation of the operating power is interrupted (S330), and updating the second time information based on the stored first and second time information in response to the occurrence of a system-on state corresponding to a state in which the supply of the operation power is resumed (S340). The first time information is information generated by a read-only timer (e.g., the security timer 210) included in the PMIC 200, and the second time information is information generated by a timer (e.g., the system timer 150) included in the application processor 100.

In operation S330, the application processor 100 encrypts the first and second time information generated when the system-off state occurs, and stores the encrypted first and second time information in the nonvolatile memory 300.

In operation S340, the application processor 100 decrypts the encrypted first and second time information when the system-on state occurs, and updates the second time information based on the first time information generated when the system-on state occurs and the decrypted first and second time information.

In operation S340, the application processor 100 calculates difference time information between the decrypted first time information and the obtained first time information, when the system-on state occurs, and updates the second time information by applying the difference time information to the decrypted second time information.

Figure 13:
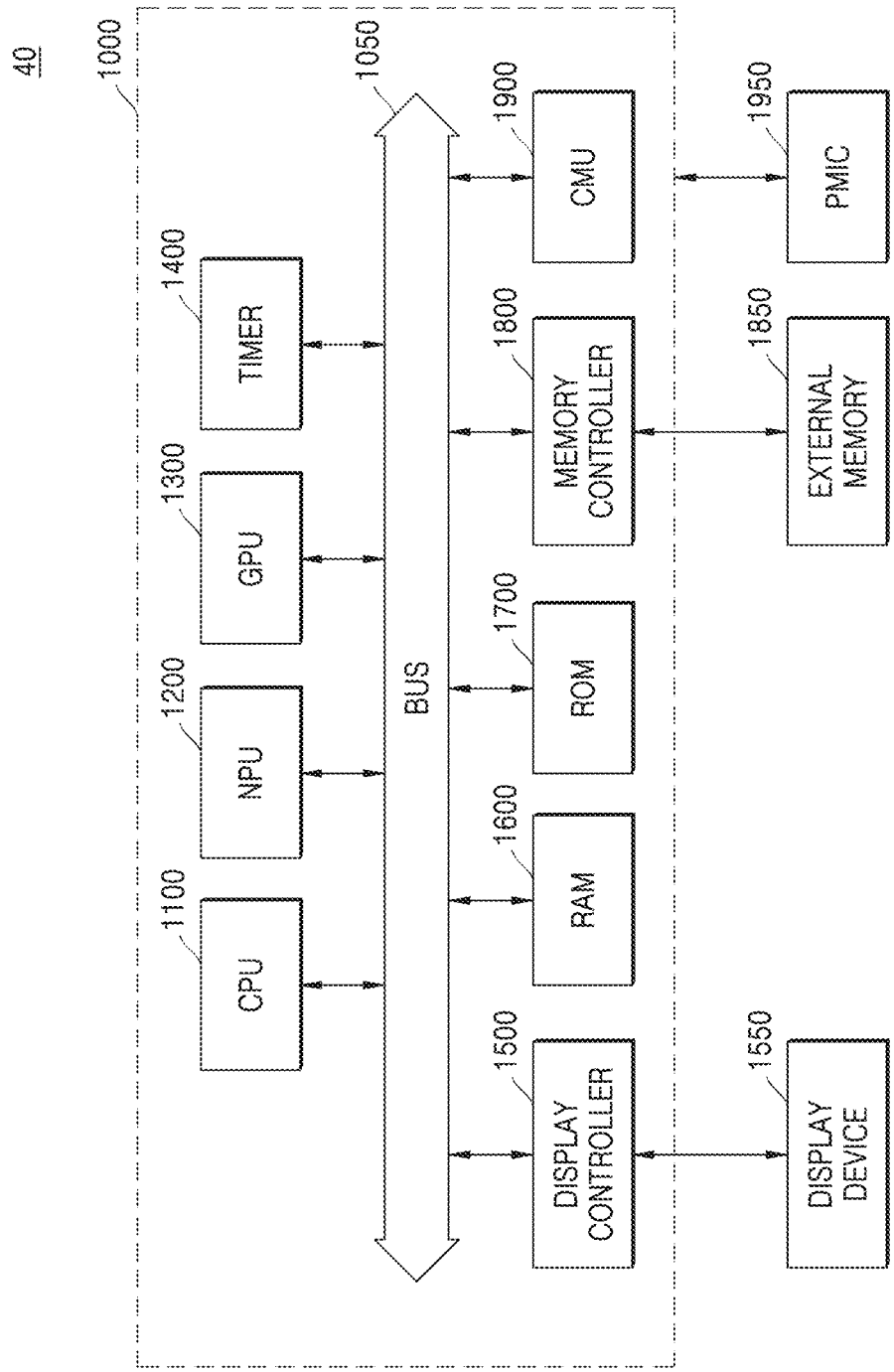
FIG. 13 is a diagram illustrating an electronic device according to some example embodiments of the inventive concepts.

FIG. 13 is a block diagram of an electronic device 40 according to some example embodiments of the inventive concepts.

Referring to FIG. 13, the electronic device 40 may be implemented as a handheld device such as a mobile phone, a smart phone, a tablet personal computer (PC), a personal digital assistant (PDA), an enterprise digital assistant (EDA), a digital still camera, a digital video camera, a portable multimedia player (PMP), a personal navigation device or portable navigation device (PND), a handheld game console, or an e-book.

The electronic device 40 may include a system on a chip 1000, an external memory 1850, a display device 1550, and a PMIC 1950.

The system on a chip 1000 may include a central processing unit (CPU) 1100, a neural processing unit (NPU) 1200, a graphics processing unit (GPU) 1300, a timer 1400, a display controller 1500, a random-access memory (RAM) 1600, a read-only memory (ROM) 1700, a memory controller 1800, a clock management unit (CMU) 1900, and a bus 1050. The system on a chip 1000 may further include other components in addition to the illustrated components. The PMIC 1950 may be implemented external to the system on a chip 1000. However, the inventive concepts are not limited thereto, and the system on a chip 1000 may include a power management unit (PMU) capable of performing the function of the PMIC 1950.

The CPU 1100 may be referred to as a processor, and may process or execute programs and/or data stored in the external memory 1850. For example, the CPU 1100 may process or execute the programs and/or the data in response to an operation clock signal output from the CMU 1900.

The CPU 1100 may be implemented as a multi-core processor. The multi-core processor is a single computing component with two or more independent substantial processors (referred to as 'cores'), each of which is able to read and execute program instructions. Programs and/or data stored in the ROM 1700, the RAM 1600, and/or the external memory 1850 may be loaded into a memory (not shown) of the CPU 1100 as necessary.

The NPU 1200 may effectively process a large number of computations by using an artificial neural network. The NPU 1200 may perform deep learning by supporting spontaneous matrix operations.

The GPU 1300 may convert data read from the external memory 1850 by the memory controller 1800 into a signal appropriate for the display device 1550.

The timer 1400 may output a count value indicating a time based on an operation clock signal output from the CMU 1900.

The display device 1550 may display image signals output from the display controller 1500. For example, the display device 1550 may be implemented as a liquid crystal display (LCD), a light-emitting diode (LED) display, an organic LED (OLED) display, an active-matrix OLED (AMOLED) display, or a flexible display. The display controller 1500 may control an operation of the display device 1550.

The RAM 1600 may temporarily store programs, data, or instructions. For example, programs and/or data stored in the memory may be temporarily stored in the RAM 1600 under the control by the CPU 1100 or according to booting code stored in the ROM 1700. The RAM 1600 may be implemented as dynamic RAM (DRAM) or static RAM (SRAM).

The ROM 1700 may store permanent programs and/or data. The ROM 1700 may be implemented as erasable programmable ROM (EPROM) or electrically EPROM (EEPROM).

The memory controller 1800 may communicate with the external memory 1850 through an interface. The memory controller 1800 may control overall operations of the external memory 1850 and control data exchange between a host and the external memory 1850. For example, the memory controller 1800 may write or read data in or from the external memory 1850 according to a request from the host. The host may be a master device such as the CPU 1100, the GPU 1300, or the display controller 1500.

The external memory 1850 may be a storage medium for storing data, and may store an operating system (OS), various programs, and/or various types of data. The external memory 1850 may be, for example, DRAM, but is not limited thereto. For example, the external memory 1850 may be a nonvolatile memory device (e.g., a flash memory device, a phase-change RAM (PRAM) device, a magnetic RAM (MRAM) device, a resistive RAM (RRAM) device, or a ferroelectric (FeRAM) device). In some example embodiments of the inventive concepts, the external memory 1850 may be an internal memory provided inside the system on a chip 1000. Also, the external memory 1850 may be flash memory, an embedded multimedia card (eMMC), or a universal flash storage (UFS).

The CMU 1900 generates an operation clock signal. The CMU 1900 may include a clock signal generator such as a phase-locked loop (PLL), a delayed-locked loop (DLL), or a crystal oscillator.

The operation clock signal may be supplied to the GPU 1300. The operation clock signal may also be supplied to other components (e.g., the CPU 1100 or the memory controller 1800). The CMU 1900 may change a frequency of the operation clock signal.

The CPU 1100, the NPU 1200, the GPU 1300, the timer 1400, the display controller 1500, the RAM 1600, the ROM 1700, the memory controller 1800, and the CMU 1900 may communicate with each other through the bus 1050.

Figure 14:
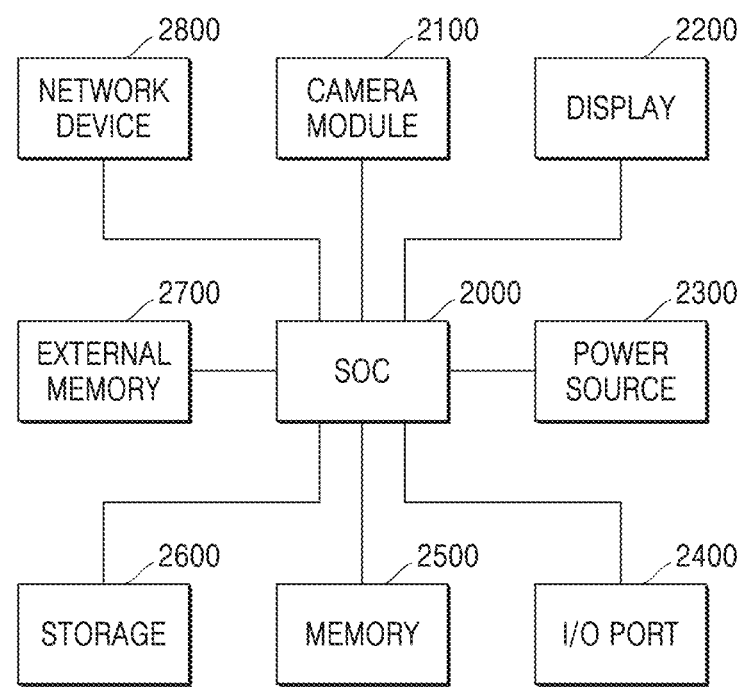
FIG. 14 is a diagram illustrating an electronic device according to some example embodiments of the inventive concepts.

FIG. 14 is a block diagram of an electronic device 50 according to some example embodiments of the inventive concepts.

Referring to FIG. 14, the electronic device 50 may be implemented as a PC, a data server, or a portable electronic device.

The electronic device 50 may include a system on a chip 2000, a camera module 2100, a display 2200, a power source 2300, an input/output port 2400, a memory 2500, a storage 2600, an external memory 2700, and a network device 2800.

The camera module 2100 may convert an optical image into an electrical image. Accordingly, the electrical image output from the camera module 2100 may be stored in the storage 2600, the memory 2500, or the external memory 2700. Also, the electrical image output from the camera module 2100 may be displayed on the display 2200.

The display 2200 may display data output from the storage 2600, the memory 2500, the input/output port 2400, the external memory 2700, or the network device 2800.

The power source 2300 may supply an operating voltage to at least one of the components.

The input/output port 2400 may transmit data to the electronic device 50 or transmit, to an external device, data output from the electronic device 50. For example, the input/output port 2400 may be a port for connecting to a pointing device such as a computer mouse, a port for connecting to a printer, or a port for connecting to a universal serial bus (USB) drive.

The memory 2500 may be implemented as a volatile memory or a nonvolatile memory. According to some example embodiments, a memory controller capable of controlling a data access operation, e.g., a read operation, a write operation (or a program operation), or an erase operation, with respect to the memory 2500 may be integrated or embedded in the system on a chip 2000. According to some example embodiments, the memory controller may be implemented between the system on a chip 2000 and the memory 2500.

The storage 2600 may be implemented as a hard disk drive or a solid-state drive (SSD).

The external memory 2700 may be implemented as a Secure Digital (SD) card or a multimedia card (MMC). According to some example embodiments, the external memory 2700 may be a subscriber identification module (SIM) card or a universal subscriber identity module (USIM) card.

The network device 2800 refers to a device capable of connecting the electronic device 50 to a wired network or a wireless network.

The electronic device 10 (or other circuitry, for example, the application processor 100, the PMIC 200, the nonvolatile memory 300, the oscillator 400, the non-security processor 110, the security processor 120, the nonvolatile memory controller 130, the first protection controller 140, the second protection controller 160, the arbiter 170, the first and second buffers 171 and 172, the interface 180, the interface 230, the system on a chip 1000, the CPU 1100, the NPU 1200, the GPU 1300, the display controller 1500, the memory controller 1800, the CMU 1900, the bus 1050, the electronic device 50, the system on a chip 2000, the camera module 2100, the display 2200, the input/output port 2400, the memory 2500, the storage 2600, the external memory 2700, and the network device 2800 or other circuitry discussed herein) may include hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, an application-specific integrated circuit (ASIC), etc.

While the inventive concepts have been particularly shown and described with reference to example embodiments thereof, it will be understood that various changes in form and details may be made therein without departing from the spirit and scope of the following claims.

What is claimed is:

1. An electronic device comprising:
a nonvolatile memory;
a power management integrated circuit configured to
generate operating power based on supply power received from a power source, and
generate first time information independent of the supply power based on a security timer, the security timer configured to generate the first time information based on a clock source; and
an application processor configured to
receive the operating power,
generate second time information based on a system timer using the operating power, the system timer different from the security timer, the system timer configured to generate the second time information based on the clock source,
obtain, based on generation of the operating power being interrupted, the first time information, and
output, to the nonvolatile memory, time data including the first time information and the second time information, a write command, and an address.

2. The electronic device of claim 1, wherein the power management integrated circuit comprises:
a power capacitor configured to
receive the supply power to charge electric charges, and
supply, based on the generation of the operation power being interrupted, auxiliary power to the security timer based on the charged electric charges; and
an interface configured to provide the first time information to the application processor.

3. The electronic device of claim 2, wherein the power management integrated circuit further comprises a ring oscillator configured to receive the auxiliary power to provide the clock source to the security timer.

4. The electronic device of claim 3, wherein the security timer comprises a read-only timer.

5. The electronic device of claim 1, wherein the application processor comprises:
an interface configured to communicate with the power management integrated circuit;
a nonvolatile memory controller configured to provide the nonvolatile memory with the time data, the write command, and the address;
and
a security processor configured to
obtain, as the first time information, time information generated by the power management integrated circuit based on the generation of the operating power being interrupted,
encrypt the first time information and the second time information, which is generated based on the generation of the operating power being interrupted, and
provide, as the time data, data including the encrypted first and second time information, to the nonvolatile memory controller.

6. The electronic device of claim 5, wherein the application processor further comprises:
a non-security processor configured to perform overall operations of the electronic device;
an arbiter comprising
a first buffer configured to store the first time information received through the interface, and
a second buffer configured to store information generated by the non-security processor;
a first protection controller configured to
transmit the second time information generated by the system timer to the security processor in response to access by the security processor, and
block access by the non-security processor; and
a second protection controller configured to
allow the security processor to access the first buffer, and
block the non-security processor from accessing the first buffer.

7. The electronic device of claim 1, further comprising an oscillator configured to provide the clock sources for generating the first time information and the second time information.

* * * * *